(12) United States Patent
Hancock et al.

(10) Patent No.: US 8,171,954 B2
(45) Date of Patent: May 8, 2012

(54) RECLOSABLE VACUUM-TIGHT PRESSURE-RELIEF DEVICE HAVING A DEFORMABLE SEAL MEMBER

(75) Inventors: Daniel A. Hancock, Media, PA (US); William L. Holstein, Hockessin, DE (US); Jeffrey L. Fleischut, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 418 days.

(21) Appl. No.: 12/561,681

(22) Filed: Sep. 17, 2009

(65) Prior Publication Data

US 2010/0072409 A1      Mar. 25, 2010

Related U.S. Application Data

(60) Provisional application No. 61/099,353, filed on Sep. 23, 2008, provisional application No. 61/099,344, filed on Sep. 23, 2008, provisional application No. 61/099,338, filed on Sep. 23, 2008, provisional application No. 61/099,343, filed on Sep. 23, 2008.

(51) Int. Cl.
*F16K 15/00* (2006.01)
*F16K 17/00* (2006.01)
*F16K 21/04* (2006.01)

(52) U.S. Cl. ............ 137/543.13; 137/540; 137/528; 251/144; 251/83

(58) Field of Classification Search ............ 251/82, 251/83, 144; 137/511, 528, 535, 540, 542, 137/543.13
See application file for complete search history.

(56) References Cited

U.S. PATENT DOCUMENTS

| | | | | |
|---|---|---|---|---|
| 2,395,941 | A * | 3/1946 | Rockwell | 137/115.15 |
| 4,515,179 | A * | 5/1985 | Edmunds et al. | 137/543.13 |
| 6,629,830 | B2 * | 10/2003 | Takahashi et al. | 418/268 |
| 7,469,712 | B2 * | 12/2008 | Jansen | 137/516.27 |

* cited by examiner

*Primary Examiner* — John Fristoe, Jr.

(57) ABSTRACT

A pressure-relief valve assembly is improved in that sealing surfaces on both the valve seat and valve head are confrontationally disposed annular planar surfaces oriented substantially perpendicular to the valve axis. A resilient valve seal is formed of a material which deforms to a predetermined extent into sealing engagement against both sealing surfaces when compressed by the spring biasing force. When a vacuum exists the combination of the spring force and a holding force created by a pressure differential acts to increase the extent of compression between the resilient valve seal and both sealing surfaces sufficient to create a vacuum-tight seal. The magnitude of the spring biasing force in discrete increments may be adjusted by varying the degree of threaded engagement between members forming the valve housing.

6 Claims, 9 Drawing Sheets

RECLOSABLE VACUUM-TIGHT PRESSURE-RELIEF DEVICE HAVING A DEFORMABLE SEAL MEMBER

CLAIM OF PRIORITY

This application claims priority from each of the following United States Provisional Applications, hereby incorporated by reference:
(1) Reclosable Vacuum-Tight Pressure-Relief Device Having A Deformable Seal Member, Application Ser. No. 61/099,353, filed 23 Sep. 2008;
(2) Reclosable Vacuum-Tight Pressure-Relief Device Having An Enclosed Housing with Replaceable Shims, Application Ser. No. 61/099,344 filed 23 Sep. 2008;
(3) Reclosable Vacuum-Tight Pressure-Relief Device Having Replaceable Standoffs, Application Ser. No. 61/099, 338 filed 23 Sep. 2008; and
(4) Continuously Adjustable Vacuum-Tight Reclosable Pressure-Relief Device, Application Ser. No. 61/099, 343 filed 23 Sep. 2008.

FIELD OF THE INVENTION

The present invention is directed to a pressure-relief device capable of releasing an overpressure condition in an associated vessel or system and capable of sealing in a leak-free manner when the associated vessel or system is under vacuum.

BACKGROUND OF THE INVENTION

Prior art pressure-relief devices that relieve an over-pressure condition in a vessel or system are available.

Some pressure-relief devices, such as rupture disks, are one-time devices which that must be replaced after they are actuated. Other, so-called reclosable, pressure-relief devices automatically close when the overpressure condition is removed.

Until it is used a rupture disk will not leak when a vacuum is drawn within the vessel. However, the prior art reclosable pressure-relief device that employs a frusto-conical valve assembly or spherical valve assembly (which may include a resilient O-ring) has been found to leak under vacuum conditions.

Accordingly, it is believed that a reclosable pressure-relief device is needed which provides a seal adequate to maintain a vacuum when the vessel is evacuated.

SUMMARY OF THE INVENTION

The present invention is directed to a pressure-relief valve assembly for mounting on a port of a vessel. The valve assembly is able to hold a seal without leaking when the vessel is evacuated. The pressure relief valve comprises:
a housing having a spring abutment surface and valve seat thereon,
a valve head displaceable along a valve axis, the valve head having a sealing surface thereon,
a resilient valve seal disposed between the valve seat and the valve head, and
a spring disposed between the spring abutment surface and the valve head for imposing a predetermined spring biasing force on the valve head to urge the valve head along the valve axis toward the valve seat.

The pressure relief valve in accordance with the present invention is improved in that:

both the valve seat and the sealing surface of the valve head are annular planar confronting surfaces oriented substantially perpendicular to the valve axis, and the resilient valve seal is an annular O-ring formed of a material which when compressed by the spring biasing force between the annular planar confronting surfaces deforms to a predetermined extent into sealing engagement against the sealing surfaces on both the valve head and the valve seat such that, when the pressure of a fluid within the vessel exceeds the desired spring biasing force the valve face lifts from the valve seat to relieve pressure within the vessel, and when a vacuum condition exists within the vessel the combination of the predetermined spring biasing force and a holding force created by a pressure differential between ambient pressure and the pressure of a fluid within the vessel acts over the valve head to increase the extent of compression between the resilient valve seal and both sealing surfaces sufficient to create a vacuum-tight seal.

BRIEF DESCRIPTION OF THE DRAWINGS

The invention will be more fully understood from the following detailed description, taken in connection with the accompanying drawings, which form a part of this application and in which.

DETAILED DESCRIPTION OF THE INVENTION

Figure 1:
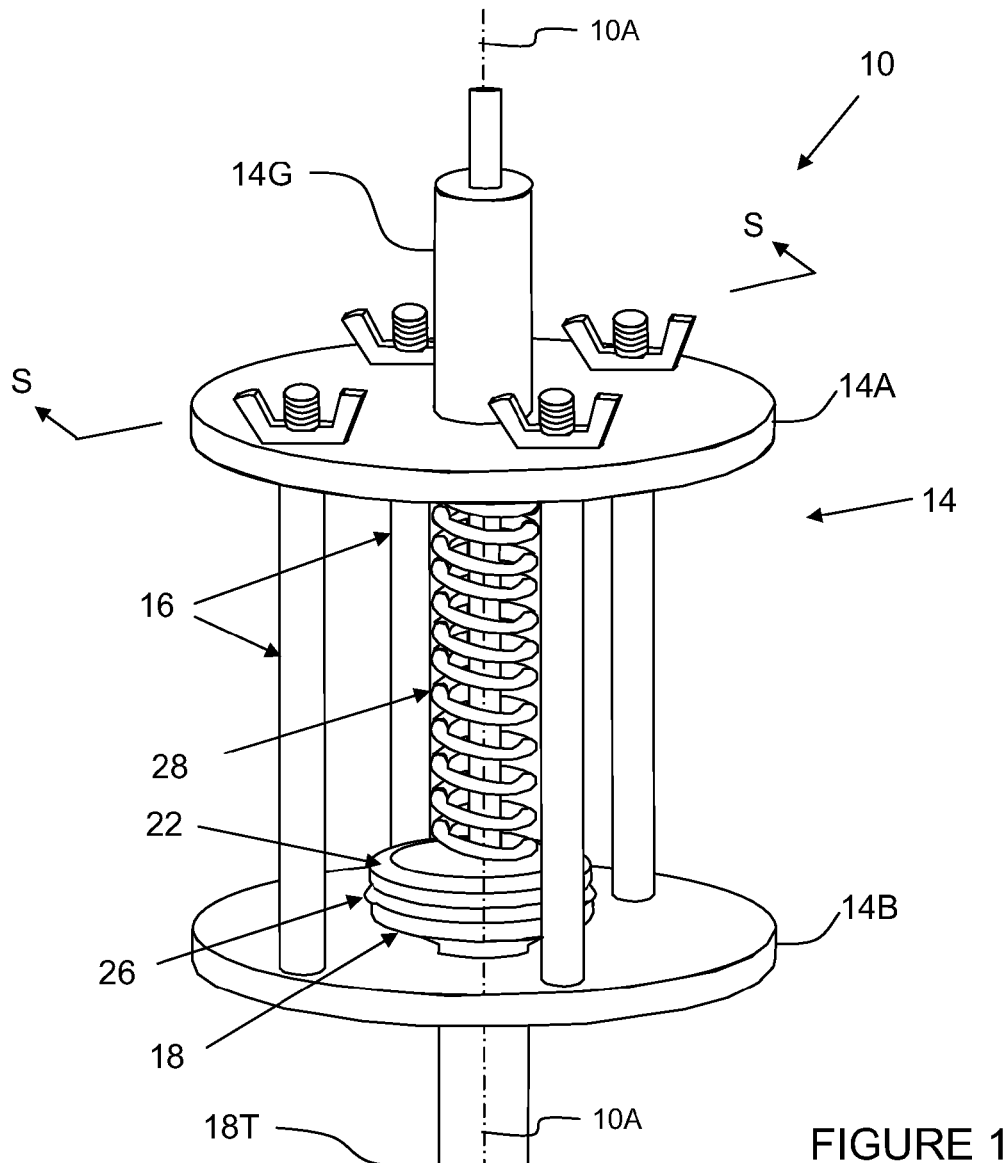
FIG. 1 is a perspective view of a vacuum-tight pressure-relief valve assembly in accordance with a first embodiment of the present invention, the valve assembly being shown in use as connected to the port of a vessel.
Figure 1:
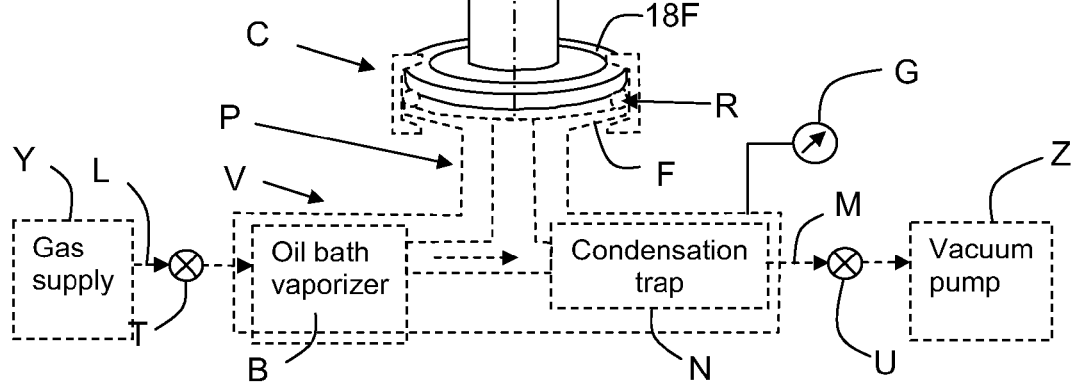

Throughout the following detailed description similar reference characters refers to similar elements in all figures of the drawings.

Figure 2:
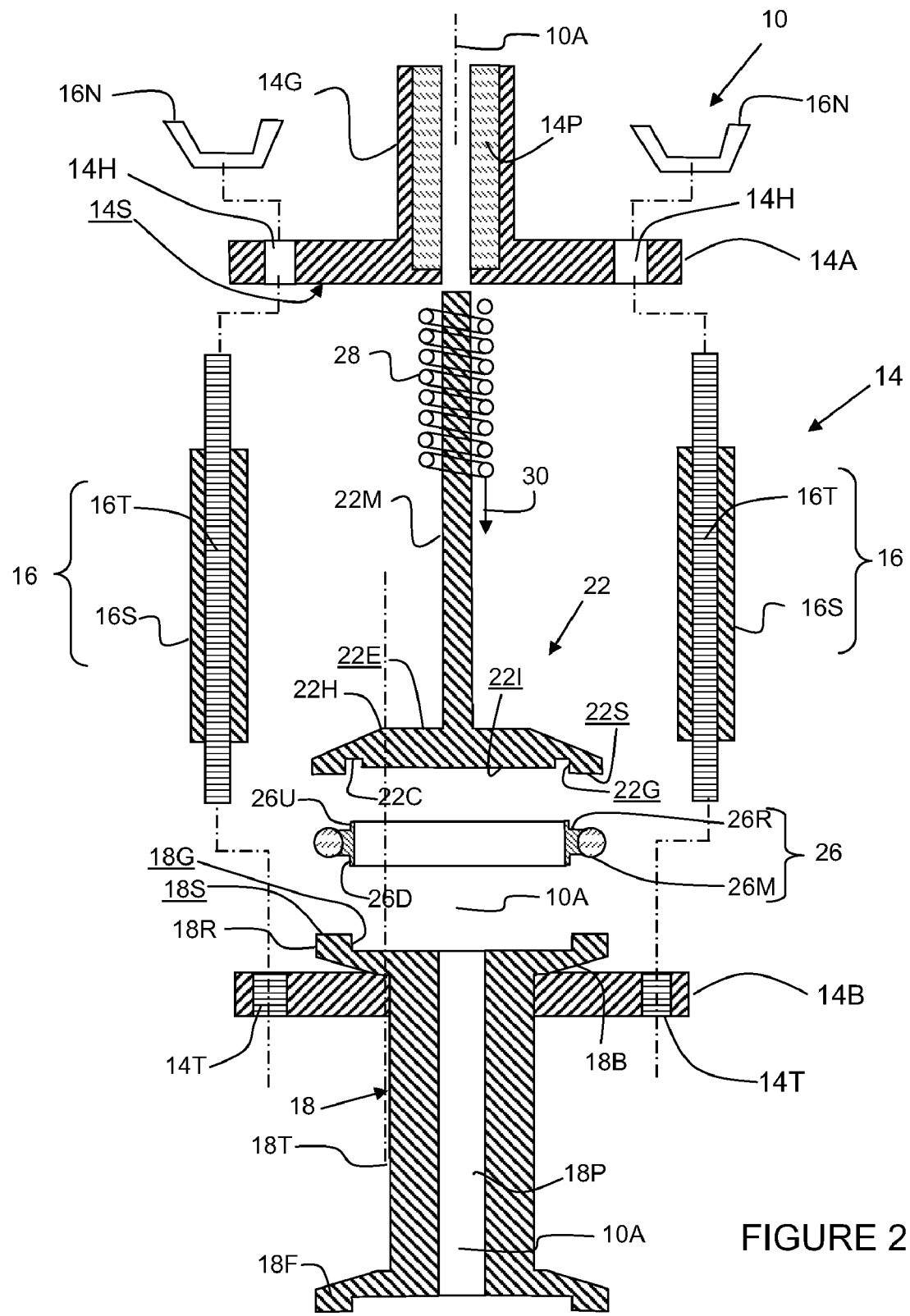
FIG. 2 is an exploded sectional view of the components of the valve assembly as shown FIG. 1 taken along section lines S-S therein.
Figure 3:
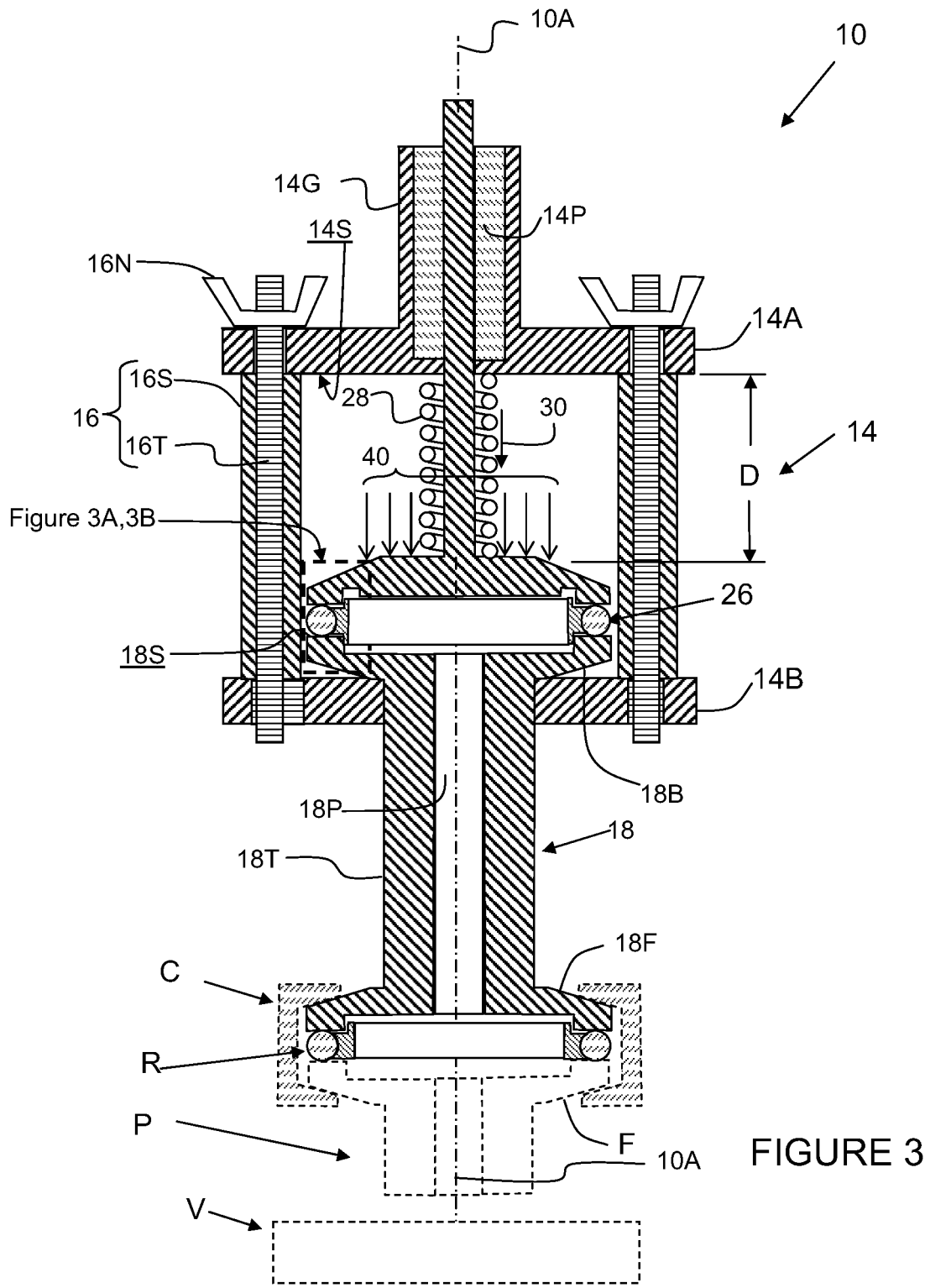
FIG. 3 is a sectional view taken along section lines S-S of FIG. 1 showing the valve assembly in closed position.
Figure 4:
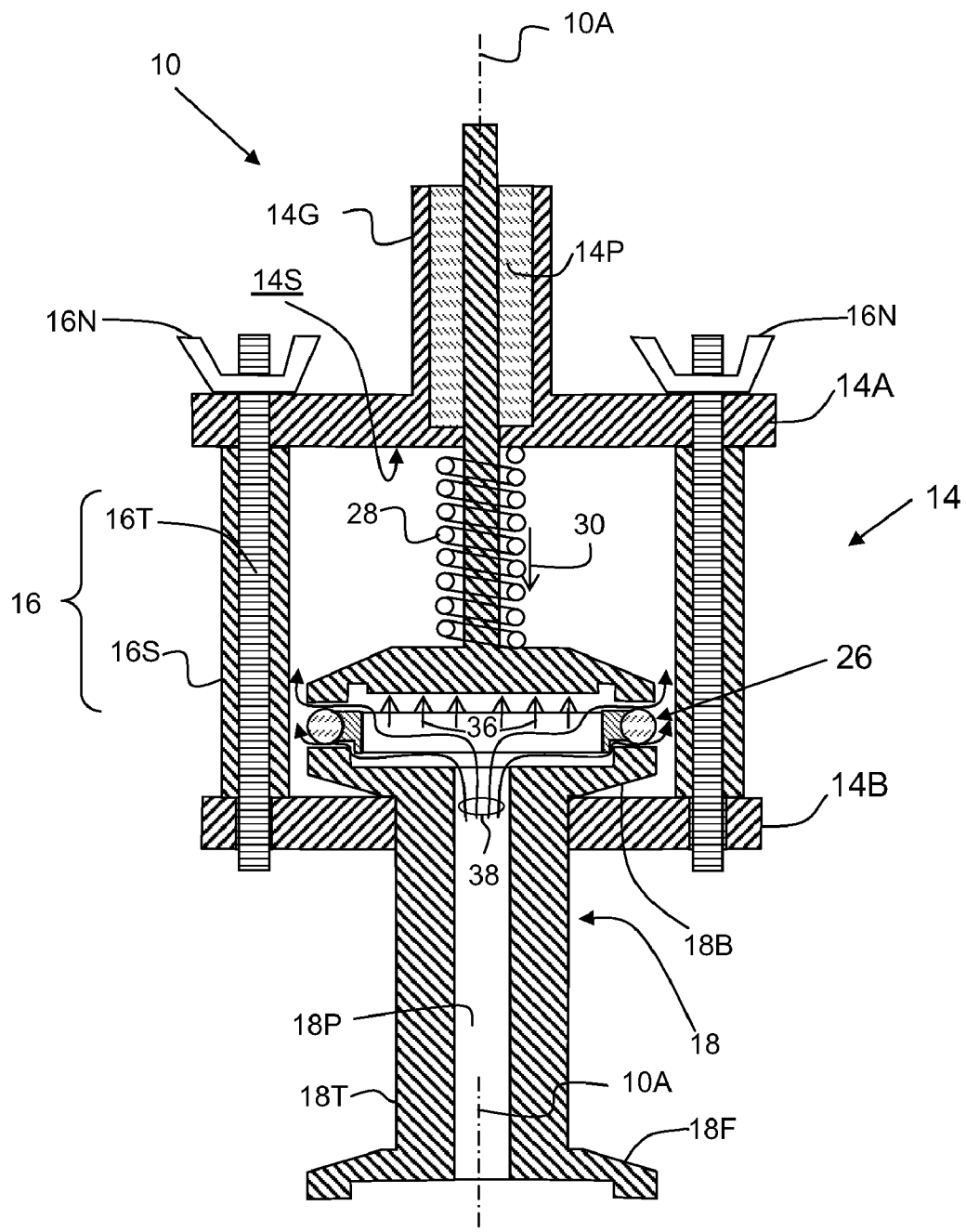
FIG. 4 is a sectional views taken along section lines S-S of FIG. 1 showing the valve assembly in open position.

FIGS. 1 and 2 respectively show perspective and exploded views illustrating the structural details of a vacuum-tight pressure-relief valve assembly, generally indicated by the reference numeral 10, in accordance with a first embodiment of the present invention. FIGS. 3 and 4 respectively illustrate the valve 10 in the closed and open (pressure relief) positions. The valve assembly has an axis 10A extending therethrough. Unless otherwise noted the valve components to be described are preferably fabricated from stainless steel, although other suitable materials having appropriate mechanical properties and corrosion resistance may be used.

The valve assembly 10 is secured, as by a clamp C (FIGS. 1 and 3) to a port P of a pressure vessel V. A seal ring R is disposed between a flange 18F on the valve assembly 10 and a flange F on the vessel V.

In a typical installation (shown in FIG. 1) the pressure vessel V receives gas from a gas supply Y through a supply line L. The vessel V is evacuated through a vacuum line M connected to a vacuum pump Z. The lines L and M each contain a respective shut-off valve T and U. The pressure and vacuum levels within the vessel V may be monitored by a combination pressure and vacuum gauge G. The vessel V may include a number of functional elements exemplified by a oil bath vaporizer B and a condensation trap N.

The valve assembly 10 is operative to effect relief of an overpressure condition within the vessel V. In addition, the valve assembly 10 is able to prevent leakage into the vessel V when the vessel V is evacuated by the pump Z.

As seen from FIGS. 1 through 4 the valve assembly 10 comprises a valve housing 14, a valve seat assembly 18, a valve poppet 22, and an annular valve seal assembly 26. In the preferred structural arrangement these valve components are circular in cross-sectional shape and concentric with respect to the valve axis 10A.

The valve housing 14 includes an upper housing plate 14A and a lower housing plate 14B. In the embodiment illustrated in FIGS. 1 through 4 the housing 14 is open to the atmosphere with the plates 14A, 14B being connected together by circumferentially positioned spacers 16. Each spacer 16 includes a threaded stud 16T (FIGS. 2 through 4) extending centrally and axially through a hollow standoff 16S. The axial ends of the standoffs 16S abut against respective confronting surfaces of the upper plate 14A and the lower plate 14B. One end of each stud 16T is received in a threaded opening 14T (FIG. 2) provided in the lower plate 14B. The other end of the each stud 16 passes through an opening 14H (FIG. 2) provided in the upper plate 14A. The stud 16T is secured by a nut 16N (such as a wing nut, as shown) bottoming against the outside surface of the upper plate 14A. The stud may terminate in a rounded screw head, if desired. A stem guide 14G, lined by a bushing 14P (e.g., FIG. 2), extends from the outside surface of the upper plate 14. The bushing 14P may be fabricated from bronze or another suitable bearing material. The inside surface of the upper plate 14A defines a spring abutment surface 14S.

Figure 5:
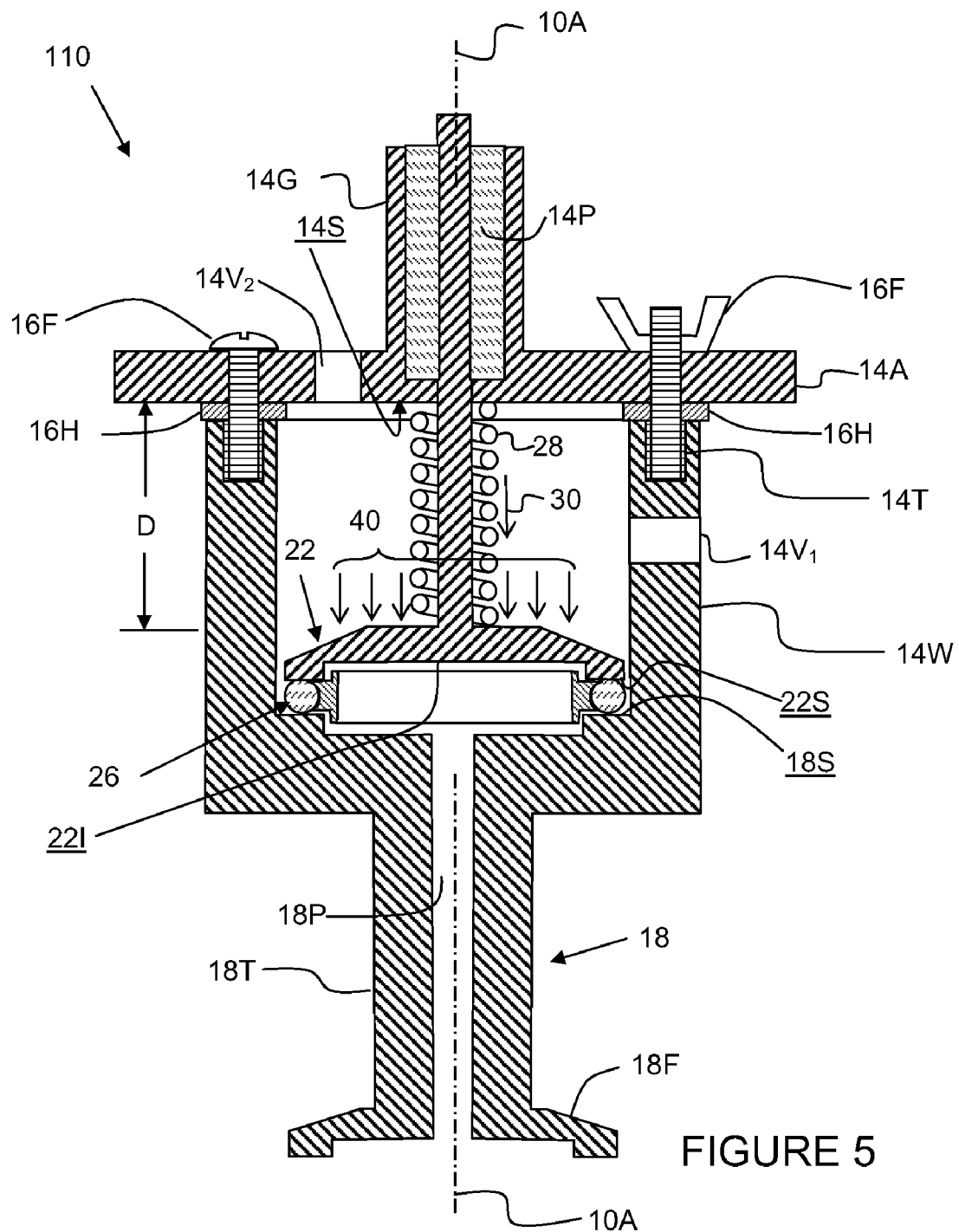
FIGS. 5 and 6 are sectional views similar to FIGS. 3 and 4 showing a second embodiment of valve assembly in accordance with the present invention in respective closed and open positions.
Figure 7:
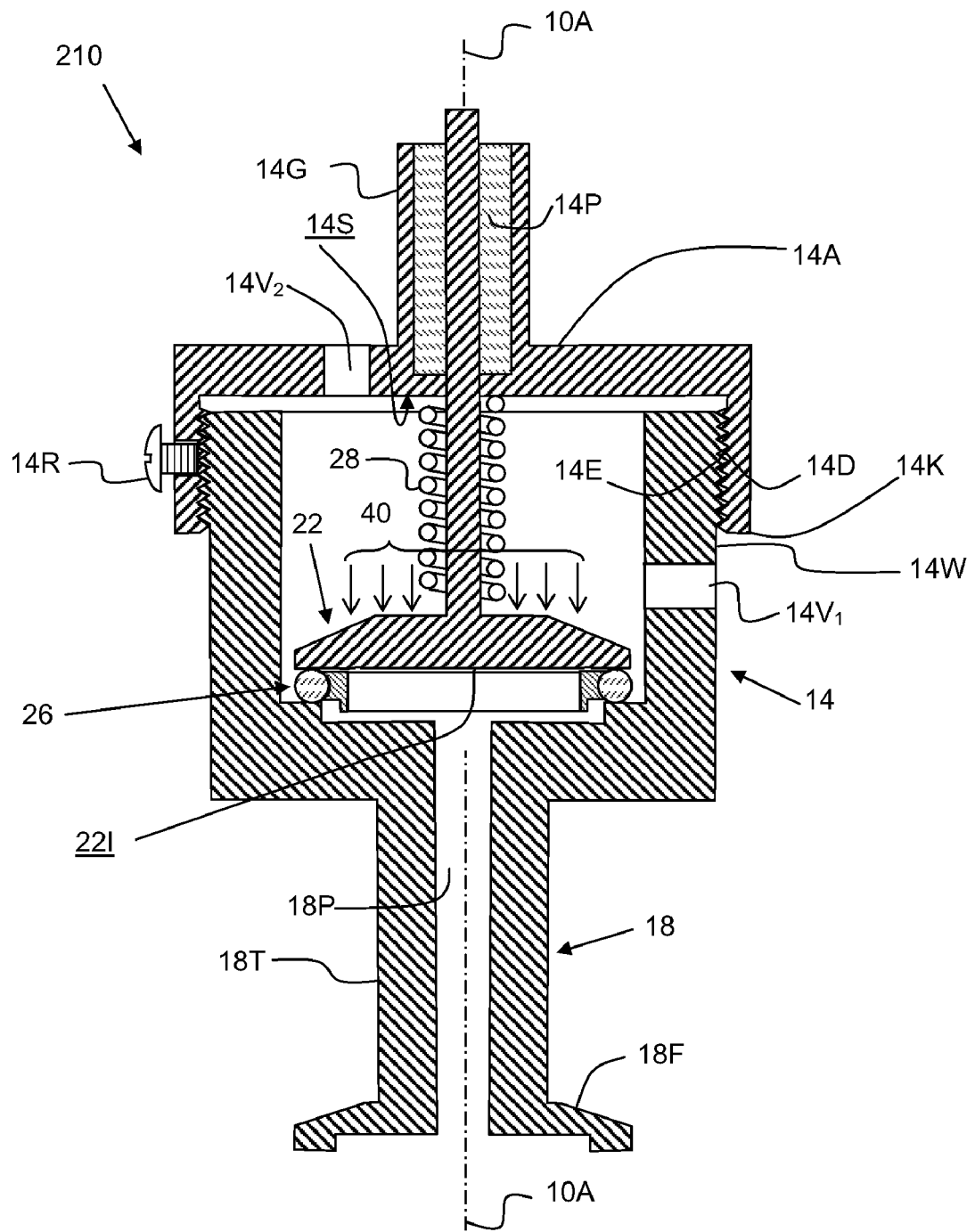
FIGS. 7 and 8 are sectional views similar to FIGS. 3, 4 and FIGS. 5, 6 showing a third embodiment of valve assembly in accordance with the present invention in respective closed and open positions.

The valve seat assembly 18 is secured to the lower plate 14B. In other embodiments (as seen in FIGS. 5 and 7) the functional components of the valve seat assembly 18 are formed integrally with the housing. The valve seat assembly includes a valve seat 18B having an upstanding rim 18R (best seen in FIG. 2) on which an annular sealing surface 18S is formed. In accordance with the present invention the sealing surface 18S is substantially planar in form and is oriented perpendicular to the axis 10A. The annular planar sealing surface 18S has a surface finish characterized by an Rz value of 6.3 micrometers or less. The Rz value of a surface finish is an International Standards Organization (ISO) ten-point height measurement which characterizes the mean peak-to-valley height of the surface. The radially inner surface of the rim 18R defines a cylindrical guide surface 18G (best seen in FIGS. 2, 3A, 3B). Extending from the opposite side of the valve seat 18B is a tail 18T having a central passage 18P therethrough. The tail 18T terminates in the flange 18F that is engaged by the clamp C (FIGS. 1 and 3) whereby the valve 10 is secured to the port P of the vessel V.

The valve poppet 22 is received within the valve housing 14 for movement along the valve axis 10A. The poppet 22 includes an enlarged valve head 22H having an interior surface 22I and an exterior surface 22E thereon (FIG. 2). An elongated valve stem 22M extends from the exterior surface 22E. The stem 22M is slidably received within the stem guide 14G.

The outer circumferential portion of the interior surface 22I of the valve head 22H defines an annular sealing surface 22S. The sealing surface 22S also has a surface finish characterized by an ISO Rz value of 6.3 micrometers or less. In accordance with the present invention the sealing surface 22S is substantially planar in form and is oriented perpendicular to the axis 10A. The sealing surfaces 18S, 22S are disposed in confrontational relationship with respect to each other. A circumferential groove 22C is disposed radially inwardly of the sealing surface 22S. A boundary wall of the groove 22C defines a cylindrical guide surface 22G (best seen in FIGS. 2, 3A, 3B) that is preferably disposed in axial alignment with the guide surface 18G.

The annular valve seal assembly 26 is captured between the valve seat 18B and the valve head 22H. The valve seal assembly 26 includes an annular seal retainer ring 26R having upstanding and/or depending guide lips 26U, 26D respectively extending from the main portion of the ring. Each guide lip 26U and/or 26D is axially aligned with a respective guide surface 22G and/or 18G (FIGS. 3A, 3B).

Figure 3A:
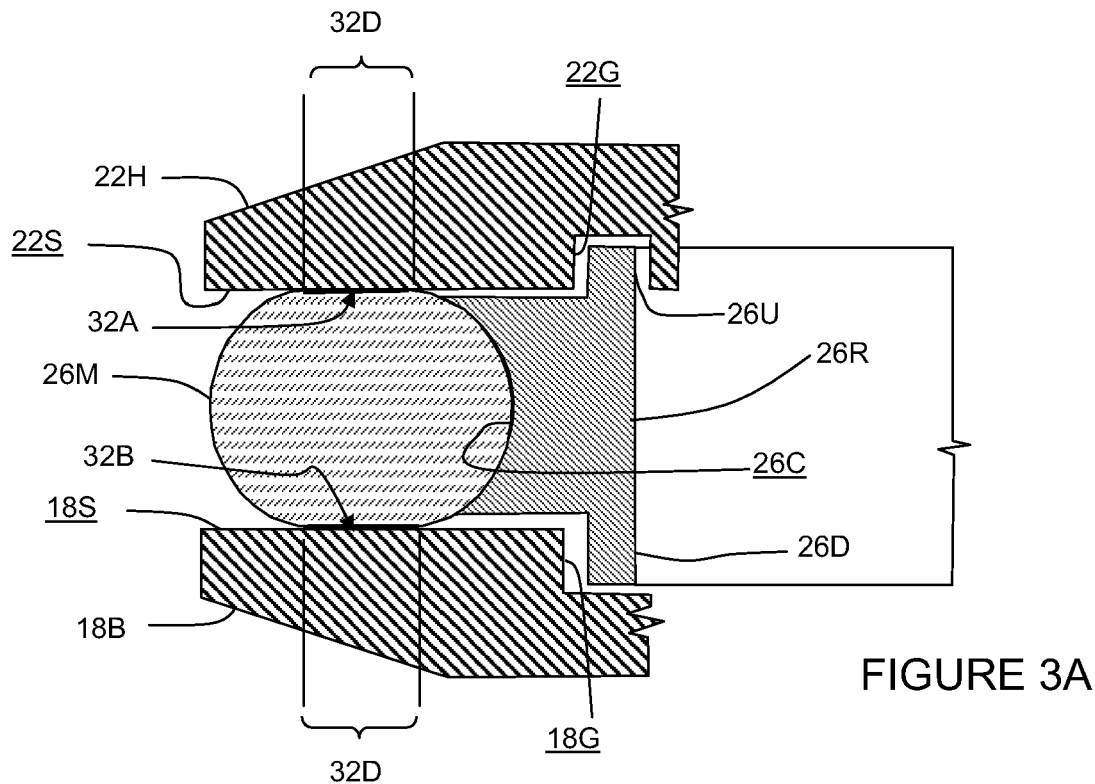
FIGS. 3A and 3B are enlarged sectional views of the region of FIG. 3 enclosed by the dashed rectangle pictorially illustrating, respectively, the deformation of the O-ring located between the valve seat and valve head while the valve assembly is in the closed position and the deformation of the O-ring located between the valve seat and valve head while the valve assembly is in the closed position and the vessel is under vacuum.
Figure 3B:
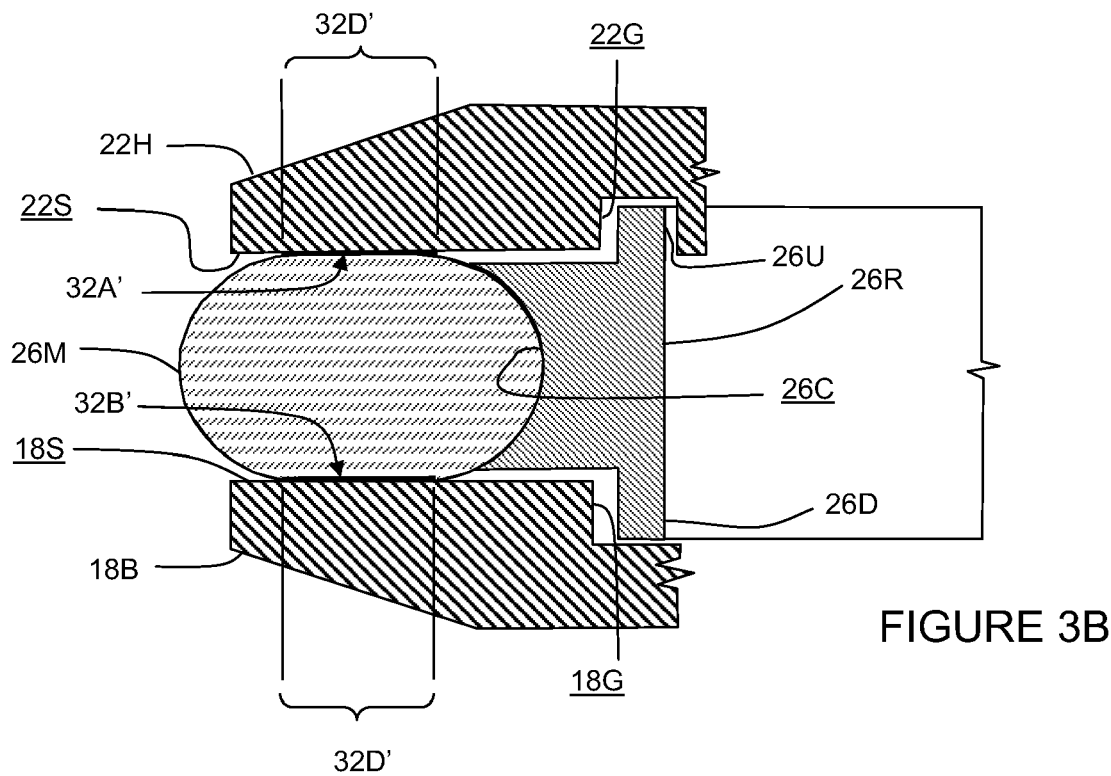

The circumference of the seal retainer ring 26R has a surface 26C that is concave in shape (best seen in FIGS. 3A and 3B). An annular resilient seal member 26M is received in the concave circumference of the retainer ring 26R. The resilient seal member 26M is preferably substantially circular in cross sectional shape, when uncompressed, as seen in FIG. 2. The ring may exhibit other uncompressed cross sectional shapes, such as elliptical. The axial dimension of the retainer ring is less than the axial cross-sectional dimension of the resilient seal member 26M. The retainer ring 26R mechanical supports the resilient seal member 26M to prevent it from being drawn into the vessel V when the same is exposed to sub-atmospheric pressure conditions, as will be developed.

In accordance with the present invention the resilient seal member 26M is formed of an elastomeric material (such as neoprene) or another compressible material such that when compressed between the annular planar confronting surfaces 18S, 22S the resilient seal member 26M is able to deform into sealing engagement between the valve head 22H and the valve seat 18B. Preferably, the seal member 26M is a twenty-eight millimeter (28 mm) diameter by five millimeter (5 mm) cross-section fluoroelastomer O-ring having a hardness of 75 Shore measured using a durometer. A neoprene O-ring having a similar hardness property may also be used.

O-ring suitable for use as the resilient seal member is available from Oerlikon Leybold Vacuum GmbH, Cologne, Germany as part number 210 615. Since the axial dimension of the main portion of the retainer ring is less than the axial cross-sectional dimension of the resilient seal member 26M when deformed the retainer ring 26R does not contact the sealing surfaces 18S, 22S on either the valve seat 18B or the valve head 22H when the valve is closed.

A biasing spring 28 is disposed between the spring abutment surface 14S and the exterior surface 22E of the valve head 22H. The biasing spring 28 is shown as a helical coil surrounding the stem 22M concentrically with the axis 10A, although any suitable form of biasing element may be used. The spring 28 imposes a biasing force of a predetermined magnitude acting in the direction 30 on the valve head 22H urging the same toward the valve seat 18B. The magnitude of the biasing force imposed by the spring 28 is dependent upon the distance D (FIG. 3) defined between the abutment surface 14S and the exterior surface 22E of the valve head 22H. The magnitude of the biasing force may be adjusted in a manner to be described.

In its normal course of operation as a pressure relief device for a vessel V containing fluid above atmospheric pressure the poppet 22 of the valve 10 is movable from a closed to an open, pressure-relief, position. As shown in FIGS. 3 and 3A, in the closed position the resilient seal member 26M is compressed (from its uncompressed cross section) between the valve seat 18B and the valve head 22H by the biasing force of the spring 28 acting in the direction 30. Since the planar annular surfaces 18S, 22S are both perpendicular to the axis 10A these surfaces uniformly compress the seal member 26M. When so compressed the resilient seal member 26M is deformed between the sealing surface 22S on the valve head 22H and the sealing surface 18S on the valve seat 18B. The annular areas of contact between the seal member 26M and the sealing surfaces 18S, 22S are shown as thickened lines in FIG. 3A and are indicated by reference characters 32A, 32B, respectively. The radial extent 32D of each annular contact area 32A, 32B is proportional to the magnitude of the biasing force of the spring 28. The presence of the retainer ring 26R permits deformation of the seal member 26M to occur only in the radially outward direction (away from the axis 10A).

When the pressure of the fluid within the vessel V acting against the surface 22I of the valve head 22H inward of the groove 22C generates a lifting force in a direction 36 (FIG. 4) that exceeds the spring biasing force the valve head 22H lifts away from the valve seat 18B. This spaces the sealing surface 22S from the seal member 26M allowing fluid from within the vessel to escape (as suggested by the flows arrows 38) to relieve the pressure therein. As illustrated fluid may also escape between the seal member 26M and the surface 18S of the valve seat 18B. As the valve opens the valve seal assembly 26 is retained between the valve seat 18B and the valve head 22H by the interaction of the guide lip(s) 26U and/or 26D with their respective guide surfaces 22G and/or 18G. The standoffs 16S are also to assist in limiting circumferential movement of the valve seal assembly 26.

The extent of the distance through which the valve head 22H lifts from the valve seat 18B is governed by the magnitude of the biasing force imposed by the spring 28. This biasing force is, in turn, governed by the length of the standoffs 16S. In the embodiment of the invention illustrated in FIGS. 1 through 4 the magnitude of the biasing force may be selectably adjusted in discrete increments by interchanging standoffs of differing lengths.

When a vacuum condition exists within the vessel a holding force acting in a direction 40 (FIG. 3) is generated due to the pressure differential between the atmosphere acting over exterior surface 22E of the valve head 22H and the subatmospheric pressure of a fluid within the vessel acting over the interior surface 22I of the valve head 22H. The combination of the predetermined spring biasing force and the holding force acts to compress further the resilient valve seal between the confronting planar annular surfaces 22S, 18S. As previously described, the perpendicular orientation of the planar annular surfaces 22S, 18S with respect to the axis 10A insures that the seal member 26M is compressed in a uniform manner. Owing to the deformability of its material the seal member 26M is able to respond to the further compression by further deforming, thereby to create enlarged contact areas 32A', 32B' (FIG. 3B). The radial extent of the enlarged contact areas 32A', 32B' is indicated by reference character 32D'. The enlargement in contact area between the deformed seal member and the planar annular sealing surfaces prevents leakage when large pressure differentials exist between the interior and the exterior of the vessel. The magnitude of the enlargement may be appreciated by comparison of FIGS. 3A and 3B. The retainer 26R prevents radially inward movement of the seal member in response to the pressure differential and prevents catastrophic failure of the seal.

Alternative embodiments of the in accordance with the present invention are illustrated in FIGS. 5 and 6 and FIGS. 7 and 8 and indicated by the reference characters 110, 210, respectively. Although the valves of these embodiments differ structurally from that shown in FIGS. 1 through 4, the valves function both to relieve pressure and to prevent loss of vacuum in the same manner as discussed earlier.

In the embodiment of the valves 110, 210 respectively illustrated in FIGS. 5 and 6 and FIGS. 7 and 8 the valve housing 14 is shown to include a generally cylindrical sidewall member 14W that substantially fully surrounds and encloses the valve poppet 22. In these embodiments the sidewall member 14W is integrated with the valve seat assembly 18 and with the lower plate 14B. The sidewall 14W has at least one vent opening $14V_1$ therethrough. The interior surface 22I of the valve head 22H is recessed radially inwardly of the guide surface 22G.

Figure 6:
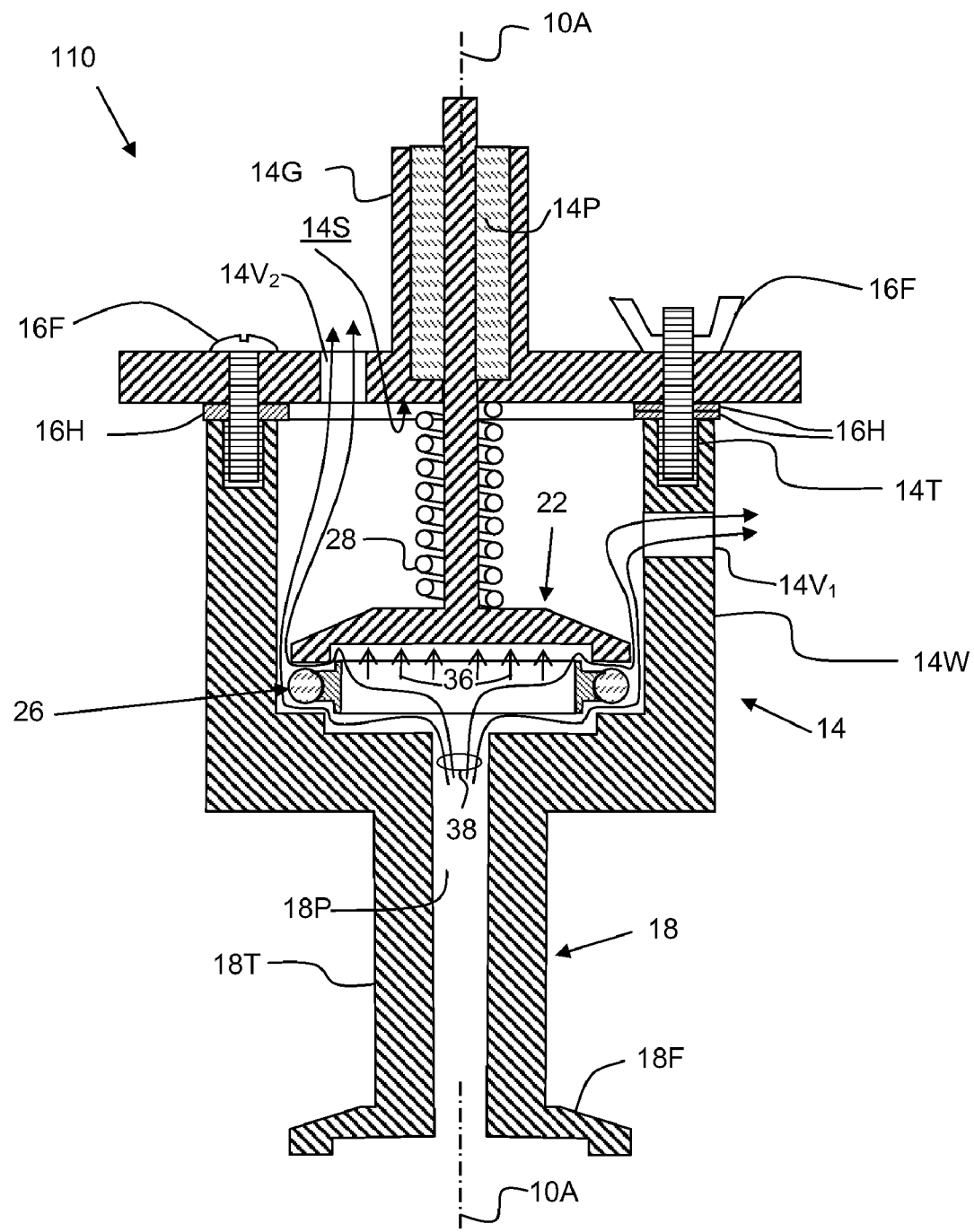

As illustrated in FIGS. 5 and 6 the plate 14A is secured to the upper edge of the sidewall 14W by the threaded fasteners 16F received within the threaded openings 14T. The relocated openings 14T are circumferentially spaced along the open upper edge of the sidewall 14W. The fasteners 16F may be implemented in various forms, such as threaded screws or a threaded stud with a nut. One or more vent openings $14V_2$ may be provided in the cover plate 14A.

In the embodiment of FIGS. 5 and 6 the adjustment arrangement for adjusting the magnitude of the biasing force imposed by the spring comprises a set of replaceable shims 16H disposed between the upper edge of the sidewall 14W and the spring abutment surface 14S of the upper plate 14A. Each shim 16H in the set has a predetermined thickness corresponding to a desired biasing force. The biasing force is adjustable in discrete increments by selectably replacing the shims in one set with a set of shims having different thicknesses. Alternatively, the biasing force is adjustable by adding at least one additional shim 16H to each shim that is deployed. This alternative is illustrated on the right hand side of FIGS. 5 and 6. The thickness of the additional shims may be of the same or may be different from the thickness of the shims in the deployed set. Replacement or additional shims are inserted between the end of the sidewall 14W and the spring abutment surface 14S. The shims 16H have openings that register with the threaded openings 14T to receive the fasteners 16F. Each shim 16H may be implemented in the form of an annular ring (as shown) or as individual washer-like members.

Figure 8:
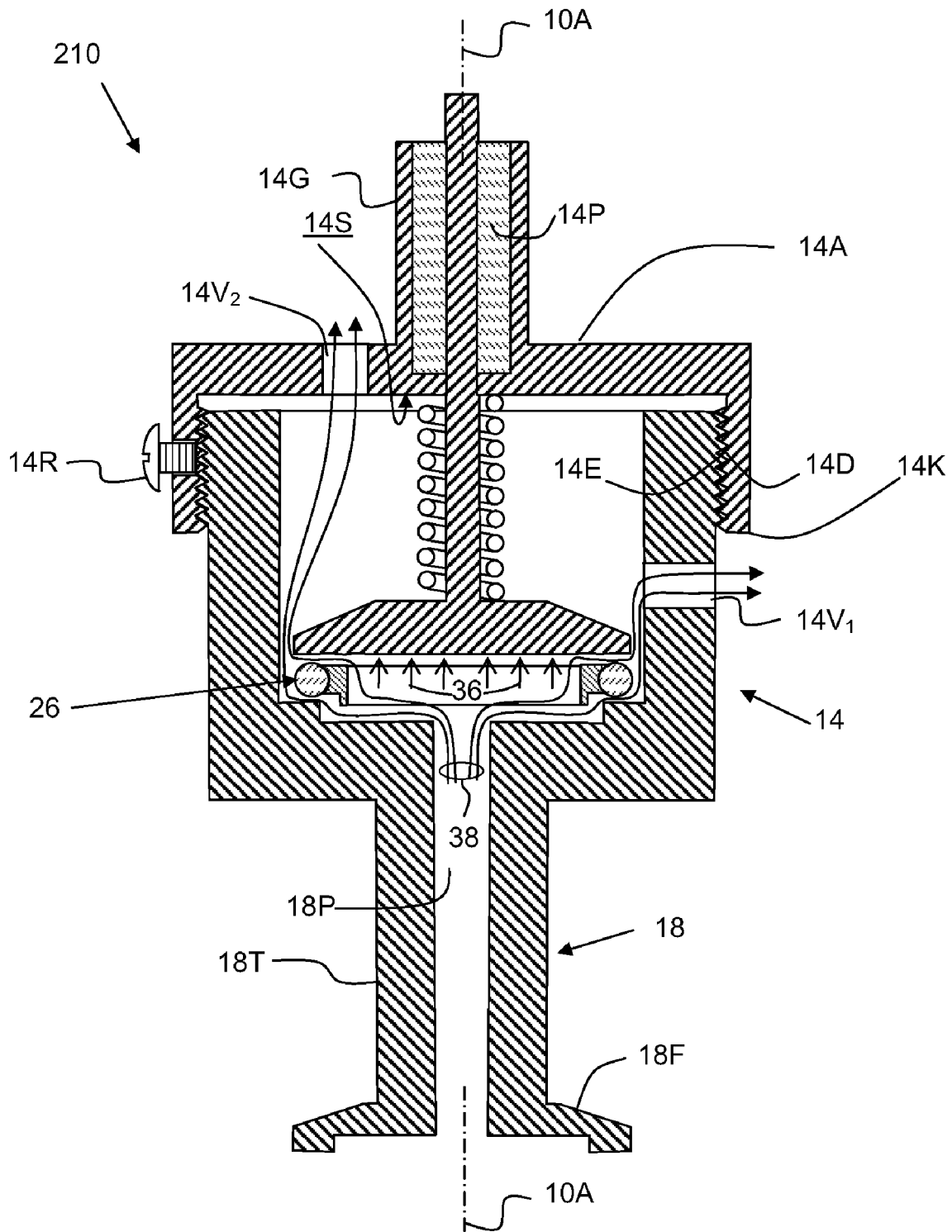

The embodiment of the valve 210 shown in FIGS. 7 and 8 also includes a substantially enclosed housing 14 having the vent openings $14V_1$ and/or $14V_2$ provided in the sidewall 14W and/or the cover plate 14A, respectively. The upper outer surface of the sidewall 14W has exterior threads 14E thereon. The cover plate 14A has a peripheral depending skirt 14K. The skirt 14K has interior threads 14D that engage the threads 14E.

The magnitude of the biasing force imposed by the spring is selectably adjusted in this embodiment by the degree of engagement of the interior threads 14D of the skirt 14K and the exterior threads 14E on the sidewall 14W. The biasing force is continuously adjustable by varying the degree of threaded engagement. A set screw 14R holds the skirt 14K and the sidewall 14W in the desired degree of engagement.

EXAMPLE

The operation of the pressure relief valve assembly in accordance with the present invention may be understood more clearly from the following examples.

An installation substantially as shown in FIG. 1 was assembled.

The pressure vessel V was implemented using an oil bath vaporizer B a two-stage condensation trap N. The vaporizer B and condensation trap N were fabricated using glass components interconnected with glass tubing. The gas supply Y provided a flow of nitrogen to the vessel V. The vacuum pump Z was implemented using a rotary vacuum pump. The shut-off valves T and U were implemented using stop-cock valves. The mounting flange F (to which all of the pressure relief devices were connected) was positioned on the vessel V adjacent to the vaporizer B.

A first test utilized a one-half inch diameter (0.5 inch, 12.7 mm) stainless steel pressure relief device identified as part #520T1-4M-5 manufactured by Circle Seal Controls, Incorporated, Corona, Calif. and distributed by Circle Valve Technologies, Incorporated, Harleysville, Pa. This valve had a spherically shaped seat and polytetrafluoethylene O-ring seal assembly rated for pressure relief at five pounds-per-square-inch (5 lbs/in$^2$, 34.5 kPa). Valve T from the gas supply was closed and valve U opened. The vessel was evacuated using the rotary vacuum pump Z. The vacuum level in the vessel was monitored during evacuation until the gauge G indicated a vacuum level of five (5) millitorr. Valve U was then closed and the vacuum level in the vessel was continuously monitored. Monitoring indicated that vacuum level was not maintained.

A second test utilized as the pressure relief device a one-half inch diameter (0.5 inch, 12.7 mm) stainless steel in-line check valve identified as part number 3008S-00T-005S manufactured by Circle Seal Controls, Incorporated and distributed by Circle Valve Technologies, Incorporated. The valve had a frusto-conical polytetrafluoethylene valve head and a frusto-conical seat. Monitoring again indicated that vacuum level was not maintained.

A third test utilized the valve assembly 10 of FIGS. 1 through 4. The spring 28 and the standoffs 16 were selected to establish the magnitude of the spring biasing force so that pressure relief would occur at five pounds-per-square-inch (5 lbs/in$^2$, 34.5 kPa). As in the first and second tests valve T from the gas supply was closed and valve U was opened. The vessel V was evacuated using the rotary vacuum pump Z. The vacuum level in the vessel V was monitored during evacuation until the gauge G indicated a vacuum level of five (5) millitorr. Valve U was then closed and the vacuum level in the vessel V was continuously monitored. Monitoring indicated that vacuum level of five (5) millitorr was maintained, indicating that the valve assembly 10 created a vacuum-tight seal.

-o-0-o-

Those skilled in the art, having the benefit of the teachings of the present invention may impart modifications thereto. Such modifications are to be construed as lying within the scope of the present invention, as defined by the appended claims.

What is claimed is:

1. A pressure-relief valve assembly for mounting on a port of a vessel, the valve assembly being able to hold a seal without leaking when the vessel is evacuated, the pressure relief valve comprising:

a housing,
a spring abutment surface disposed within the housing,
a valve seat having a sealing surface thereon,
a valve head displaceable along a valve axis, the valve head having a sealing surface thereon,
a resilient valve seal disposed between the valve seat and the valve head, and
a spring disposed between the spring abutment surface and the valve head for imposing a predetermined spring biasing force on the valve head to urge the valve head along the valve axis toward the valve seat,
wherein the improvement comprises:
both the sealing surface on the valve seat and the sealing surface on the valve head are annular planar surfaces disposed in confrontational relationship with respect to each other and oriented substantially perpendicular to the valve axis, and wherein
the resilient valve seal is an annular O-ring formed of a material which when compressed by the spring biasing force between the annular planar confronting surfaces deforms to a predetermined extent into sealing engagement against the sealing surfaces on both the valve head and the valve seat such that, when the pressure of a fluid within the vessel exceeds the desired spring biasing force the valve face lifts from the valve seat to relieve pressure within the vessel, and
when a vacuum condition exists within the vessel the combination of the predetermined spring biasing force and a holding force created by a pressure differential between ambient pressure and the pressure of a fluid within the vessel acts over the valve head to increase the extent of compression between the resilient valve seal and both sealing surfaces sufficient to create a vacuum-tight seal.

2. The pressure-relief valve assembly of claim 1 wherein the valve assembly further includes:

an adjustment arrangement for adjusting the magnitude of the spring biasing force, and wherein
the valve housing is a generally enclosed member having a vent opening extending therethrough,
wherein the improvement comprises:
the adjustment arrangement includes a set of replaceable shims disposed in the housing, each shim in the set having a predetermined thickness corresponding to a desired spring biasing force,
the desired spring biasing force being adjustable in discrete increments by selectably interchanging each shim in a set of shims with a corresponding shim having a different thickness
such that when the pressure of a fluid within the vessel exceeds the desired spring biasing force the valve face lifts from the valve seat to relieve pressure within the vessel.

3. The pressure-relief valve assembly of claim 1 wherein the valve assembly further includes:

an adjustment arrangement for adjusting the magnitude of the spring biasing force, and wherein
the valve housing is a generally enclosed member having a vent opening extending therethrough,
wherein the improvement comprises:
the adjustment arrangement includes a set of shims, each shim in the set being disposed at a predetermined location in the housing, each shim in the set having a predetermined thickness corresponding to a desired spring biasing force,
the desired spring biasing force being adjustable in discrete increments by adding at least one additional shim at each predetermined location within the housing such that when the pressure of a fluid within the vessel exceeds the desired spring biasing force the valve face lifts from the valve seat to relieve pressure within the vessel.

4. The pressure-relief valve assembly of claim 1 wherein the valve assembly further includes:

an adjustment arrangement for adjusting the magnitude of the spring biasing force, wherein the improvement comprises:

the valve housing having a generally cylindrical enclosed member and a plate member, the cylindrical member having threads thereon and a vent opening extending therethrough, the plate member having a threaded skirt thereon, the valve seat being disposed on one of the members and the spring abutment surface being disposed on the other of the members, the desired spring biasing force being determined by the degree of engagement of the threaded skirt and the threads on the cylindrical housing, the desired spring biasing force being continuously adjustable by varying the degree of threaded engagement, such that when the pressure of a fluid within the vessel exceeds the desired spring biasing force the valve face lifts from the valve seat to relieve pressure within the vessel.

5. The valve of claim 4 wherein the spring abutment surface is disposed on the plate member and the valve seat is disposed on the cylindrical member.

6. The pressure-relief valve assembly of claim 1 wherein the valve assembly further includes:

an adjustment arrangement for adjusting the magnitude of the spring biasing force, wherein the improvement comprises:

the adjustment arrangement has a plurality of replaceable, angularly spaced, equal length standoffs, the length of the standoffs corresponding to a desired spring biasing force, the desired spring biasing force being adjustable in discrete increments by selectably interchanging all of the standoffs with corresponding standoffs of a different length, such that when the pressure of a fluid within the vessel exceeds the desired spring biasing force the valve face lifts from the valve seat to relieve pressure within the vessel.

\* \* \* \* \*